United States Patent [19]

Neal et al.

[11] Patent Number: 5,302,188

[45] Date of Patent: Apr. 12, 1994

[54] NITROGEN OXIDES AND SULFUR OXIDES REMOVAL UTILIZING TRANSPORT LINE ADSORBER

[75] Inventors: Lewis G. Neal, Finleyville; Warren Ma, Pittsburgh, both of Pa.

[73] Assignee: Noxso Corporation, Bethel Park, Pa.

[21] Appl. No.: 17,864

[22] Filed: Feb. 16, 1993

Related U.S. Application Data

[63] Continuation of Ser. No. 801,697, Dec. 2, 1991, abandoned.

[51] Int. Cl.$^5$ ............................................. B01D 53/12
[52] U.S. Cl. ........................................ 95/34; 95/109;
  95/115; 95/129; 95/137; 95/269
[58] Field of Search ................ 55/73, 77, 79, 179,
  55/181, 208, 390; 422/178; 423/244.01; 95/34,
  109, 115, 129, 137, 148, 269, 288

[56] References Cited

U.S. PATENT DOCUMENTS

| | | | |
|---|---|---|---|
| 2,397,566 | 4/1946 | Schutte | 55/390 X |
| 2,992,065 | 7/1961 | Feustel et al. | 55/79 X |
| 3,563,704 | 2/1971 | Torrence | 55/73 |
| 3,727,376 | 4/1973 | Szirmay | 55/79 X |
| 3,960,529 | 6/1976 | Juntgen et al. | 55/390 |
| 3,966,879 | 6/1976 | Groenendaal et al. | 55/73 X |
| 3,976,446 | 8/1976 | Sims | 55/73 |
| 4,004,885 | 1/1977 | Groenendaal et al. | 55/390 X |
| 4,215,101 | 7/1980 | Kriegel et al. | 55/79 X |
| 4,302,221 | 11/1981 | Tanaka | 55/73 X |
| 4,609,539 | 9/1986 | Horecky et al. | 55/73 X |
| 4,612,177 | 9/1986 | Kretchmer et al. | 55/73 X |
| 4,692,318 | 9/1987 | Tolpin et al. | 55/73 X |
| 4,755,499 | 7/1988 | Neal et al. | 502/415 |
| 4,798,711 | 1/1989 | Neal et al. | 423/239 |
| 4,917,875 | 4/1990 | Moore et al. | 55/73 |
| 4,940,569 | 7/1990 | Neal et al. | 55/77 |

*Primary Examiner*—Robert Spitzer
*Attorney, Agent, or Firm*—R. Gale Rhodes, Jr.

[57] ABSTRACT

Removal of $NO_x$ and $SO_x$ from flue gas utilizing a transport line adsorber through which sorbent is transported by pressurized flue gas to cause the sorbent to adsorb $NO_x$ and $SO_x$ from the flue gas while the flue gas is transporting the sorbent through the transport line adsorber A plurality of interconnected cyclones is utilized to contact sorbent saturated with $NO_x$ and $SO_x$ removed from the flue gas with a heated gas to heat the sorbent and remove the $NO_x$ from the sorbent and separate the sorbent and the heated gas to produce an off stream of heated gas carrying the removed $NO_x$ away; the heated gas and gravity combine to pass the sorbent through the plurality of cyclones and which cyclones are positioned vertically and successively downwardly with respect to each other. A plurality of interconnected cyclones is also utilized to contact heated sorbent having the $NO_x$ and $SO_x$ removed therefrom with a cooling gas to cool the sorbent and separate the sorbent from the cooling gas to produce cooled regenerated sorbent for recycling and repeating of the $NO_x$ and $SO_x$ flue gas removal.

1 Claim, 3 Drawing Sheets

NITROGEN OXIDES AND SULFUR OXIDES REMOVAL UTILIZING TRANSPORT LINE ADSORBER

This is a continuation of application Ser. No. 07/801,697, filed Dec. 2, 1991, now abandoned.

BACKGROUND OF THE INVENTION

This invention is an improvement in the apparatus and process disclosed in U.S. Pat. No. 4,798,711 entitled PROCESSES FOR REMOVING NITROGEN OXIDES, SULFUR OXIDES AND HYDROGEN SULFIDE FROM GAS STREAMS, issued Jan. 17, 1989, Lewis G. Neal, et al. inventors, and assigned to the same assignee as the present invention. This prior art process is referred to in the art as the NOXSO Process. The NOXSO Process is illustrated in FIG. 1 wherein there is shown a flue gas stream, 12 containing both nitrogen oxides or $NO_x$ (NO and $NO_2$ OR $N_2O_4$) and sulfur oxides or $SO_x$ ($SO_2$ and $SO_3$) from, for example, a coal-fired or oil-fired power plant (not shown) which flue gas stream is passed through a fluid bed adsorber 14 containing suitable sorbent particles or beads, such as, for example, those disclosed in U.S. Pat. No. 4,755,499 entitled SORBENT FOR REMOVING NITROGEN OXIDES, SULFUR OXIDES AND HYDROGEN SULFIDE FROM GAS STREAMS, issued Jul. 5, 1988, Lewis G. Neal, et al., inventors, and assigned to the same assignee as the present invention. Adsorber 14 has a fluidizing grid 15. The sulfur oxides and nitrogen oxides are adsorbed on the surfaces of the sorbent particles and removed from the flue gas stream. The two above-identified patents are hereby incorporated herein by reference as if fully reproduced herein.

The saturated sorbent particles 16, i.e. sorbent particles having adsorbed the $NO_x$ and $SO_x$ from the flue gas, is subsequently transported to a staged, fluid bed heater 18 wherein the sorbent particles temperature is raised above 532° C. (1000° F.) using high temperature air 20 supplied by air heater 22 into which air heater a stream of ambient air 24 and a suitable fuel stream 26, e.g., natural gas, enter. The sorbed $NO_x$ is removed or stripped from the sorbent particles and carried away in the hot gas stream which passes through cyclone 28 and via stream 30 is mixed with the power plant combustion air stream (not shown).

The hot sorbent particles with the $NO_x$ removed therefrom is transferred from the sorbent heater 18 into a moving bed regenerator 32 via line 34. In the moving bed regenerator 32, the sorbent particles are contacted with a suitable regenerant gas stream 36. The regenerant gas 36 reacts with the $SO_x$ adsorbed by the sorbent particles to produce elemental sulfur. Off-gas stream 38 containing elemental sulfur is transported into a sulfur condenser and mist eliminator 45 wherein a steam stream 42, water stream 44 and elemental sulfur stream 46 are produced. A stream 40 from the sulfur condenser and mist eliminator 45 is returned to regenerator 32.

The regenerated sorbent particles, i.e. sorbent particles with the $SO_x$ and $NO_x$ removed, is transported via stream 48 past valve 50 to a staged, fluid bed sorbent cooler 52, where it is contacted with atmospheric air supplied via line 54 to reduce its temperature to about 120° C. (250° F.). The heated atmospheric air 56 subsequently is transported to gas heater 22 where its temperature is increased well above 532° C. (1000° F.) for use as the heated medium in fluid bed heater 18.

Cooled regenerated sorbent particles via line 58 is transported via line 58 by air in line 54 to a pneumatic lift line 60 and into a cyclone separator 62 via stream 64. Cyclone separator 62 separates stream 64 into a stream of air 66 and a stream of regenerated sorbent particles 68. Regenerated sorbent stream 68 enters the fluid bed adsorber 14. The discharge gas from adsorber 14 exits via line 70.

In brief summary, it will be understood that the $SO_x$ and $NO_x$ are removed from the flue gas stream 12 by the fluid bed adsorber 14 to produce a stream of $NO_x$ and $SO_x$ free flue gas 70 and thereafter the fluid bed heater 18, moving bed regenerator 32 and fluid bed sorbent cooler 52 regenerate the sorbent particles which adsorbed the $SO_x$ and $NO_x$ in the fluid bed adsorber 14 whereafter the regenerated sorbent particles are transported via line 58 to the pneumatic lift line 60 for return through the cyclone separator 62 to the fluid bed adsorber 14 where the NOXSO Process is repeated.

The above-described NOXSO Process has been found to be highly efficient in the removal of $SO_x$ and $NO_x$ from flue gas and since the sorbent particles or beads utilized are relatively large, approximately 10 mesh (2,000 microns) to 20 mesh (840 microns) (note incorporated U.S. Pat. No. 4,755,499, Col. 8, line 8), the process has the advantage that the sorbent particle or bead size is large relative to fly ash particles typically found in flue gas and therefore such sorbent beads or particles are easily distinguished from the fly ash and easily separated therefrom. A further advantage is that due to the relatively large size (approximately 10 to 20 mesh) the sorbent particles or beads have a relatively large mass which means they have a relatively high terminal velocity which substantially precludes the sorbent particles or beads from leaving the fluid or fluidized state and escaping from the fluid bed heater 18 and fluid bed cooler 52 with the exiting gases and being lost; the terminal velocity is the velocity at which the sorbent particles or beads in a fluid bed cease being in the fluid or fluidized state and escape from the fluid bed and become subject to entrainment into gas exiting the fluid bed and loss. However, the above-described NOXSO Process has some disadvantage in that the relatively large size sorbent particles or beads (approximately 10 to 20 mesh) are relatively expensive to make, the adsorption rate is diffusion controlled and therefore relatively slow, the sorbent particles or beads are porous (note for example the micropores and macropores of the sorbent particles shown in FIG. 7 of the patents incorporated above by reference) and the center portions of such beads or particles tend not to be completely used in $SO_x$ and $NO_x$ adsorption, the relatively large beads with the relatively large mass tend to break and attrite when they impact a solid surface at a relatively high velocity, and since the apparatus used to practice the process illustrated in FIG. 1 is essentially a gravity feed process, the sorbent particles or beads upon adsorbing the $SO_x$ and $NO_x$ are at the top of the apparatus and the regenerated beads, due to the gravity flow utilized, are present at the bottom of the apparatus requiring that they be lifted back up to the top of the apparatus, such as by the pneumatic lift line 60 in FIG. 1, for recycling.

It has been found that sorbent particles or beads of a comparatively or relatively small size, approximately 70 mesh (210 microns) to 140 mesh (105 microns), have the following comparative advantages vis-a-vis the above-noted relatively large sorbent beads or particles. The smaller size sorbent beads or particles adsorb the $SO_x$ and $NO_x$ more rapidly because the process is chemically not diffusion controlled (see FIG. 2 where the $NO_x$ adsorption rate is compared for sorbent particles or beads of particle sizes 1,300, 630 and 300 microns, respectively; the removal rate for particles of 300 microns particle size is about 5 times greater than for the particles of 1,300 microns particle size), the relatively small size sorbent beads or particles are easier to make and therefore less expensive which in turn makes the $SO_x$ and $NO_x$ removal process less expensive, and it has been found or discovered that due to the relatively smaller mass of the relatively smaller sorbent beads or particles, the apparatus for lifting the regenerated beads to the top of the apparatus used to practice the NOXSO Process, such as the above-noted pneumatic lift line 60 in FIG. 1, can be utilized as both a vehicle for lifting the regenerated sorbent particles back up to the top of the apparatus and a vehicle for containing the sorbent particles or beads while they are adsorbing $NO_x$ and $SO_x$ from the flue gas.

Further, as known to those skilled in the fluid bed art and as noted above, solid particles such as the present sorbent particles or beads, have a fluidization velocity and a terminal velocity. The fluidization velocity is the velocity at which the sorbent particles or beads become fluidized, i.e. moves in a fluid state under the influence of a pressurized gas and the terminal velocity is the velocity at which the beads become entrained in the gas and then escape from the fluid state and from the fluid bed. While the above-noted relatively large sorbent beads or particles (approximately 10 to 20 mesh) due to their relatively large size and therefore relatively large mass have a relatively high terminal velocity and hence remain in the fluidized state when subjected, for example, to conditions in the fluid bed heater 18 and fluid bed cooler of FIG. 1 in the NOXSO Process, it has been found that the relatively small sorbent beads or particles (approximately 70 to 140 mesh) have a relatively low terminal velocity with the tendency to escape from the fluidized state and be lost when utilized in apparatus such as the fluid bed heater 18 and fluid bed cooler 52 of FIG. 1.

In view of the foregoing, it will be understood that there exists a need in the flue gas $SO_x$ and $NO_x$ removal art of new and improved process and apparatus which utilizes the above-noted relatively small sorbent beads or particles (approximately 70 to 140 mesh) and which permits the function of the pneumatic lift line 60 and fluid bed adsorber 70 of FIG. 1 to be combined in a single apparatus or process step, and further that there exists a need for new and improved apparatus and process for contacting the saturated sorbent particles with a heating gas to heat the saturated sorbent particles and remove the $NO_x$ therefrom and for contacting the heated sorbent particles with a cooling gas after $NO_x$ and $SO_x$ removal therefrom to cool the sorbent particles and produce cooled regenerated sorbent particles for continuous repeating of the $NO_x$ and $SO_x$ removal process.

SUMMARY OF THE INVENTION

It is the object of the present invention to satisfy the foregoing needs in the $NO_x$ and $SO_x$ removal art.

Apparatus and process satisfying such needs and embodying the present invention utilize a transport line adsorber through which sorbent particles are transported by pressurized flue gas to cause the sorbent to adsorb $NO_x$ and $SO_x$ from the flue gas while the flue gas is transporting the sorbent particles through the transport line adsorber. In a further embodiment, a plurality of interconnected cyclones is utilized to contact sorbent particles saturated with $NO_x$ and $SO_x$ removed from the flue gas with a heated gas to heat the sorbent particles and remove the $NO_x$ from the sorbent particles and separate the sorbent particles and the heated gas to produce an off stream of heated gas carrying the removed $NO_x$ away; the heated gas and gravity combine to pass the sorbent particles through the plurality of cyclones which cyclones are positioned vertically and successively downwardly with respect to each other. In a still further embodiment, a plurality of interconnected cyclones is utilized to contact heated sorbent particles having the $NO_x$ and $SO_x$ removed therefrom with a cooling gas to cool the sorbent particles and separate the sorbent particles from the cooling gas to produce cooled regenerated sorbent particles for recycling and repeating of the $NO_x$ and $SO_x$ flue gas removal.

DESCRIPTION OF THE INVENTION

Figure 1:
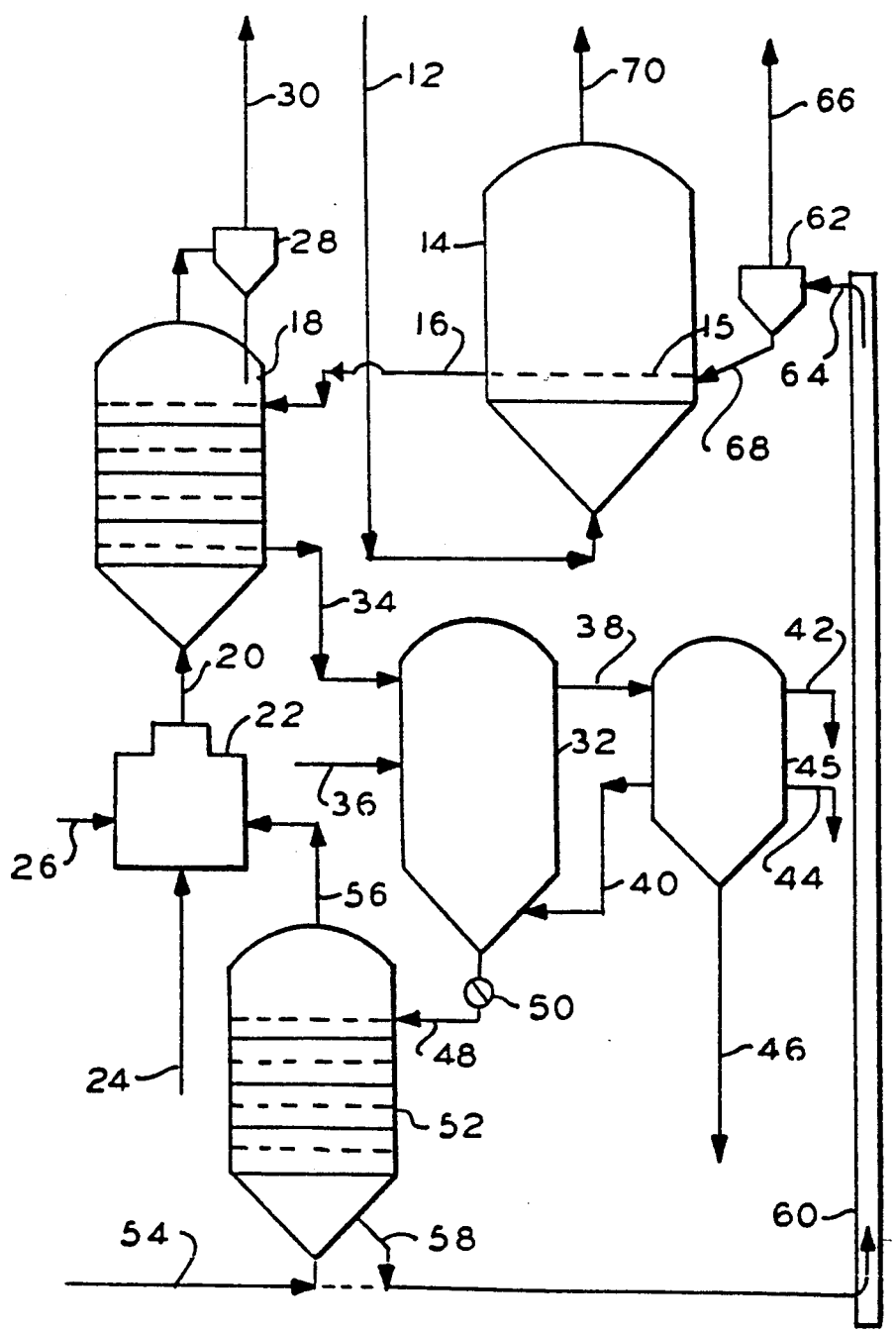
FIG. 1 is a diagrammatical illustration of the NOXSO Process.
Figure 2:
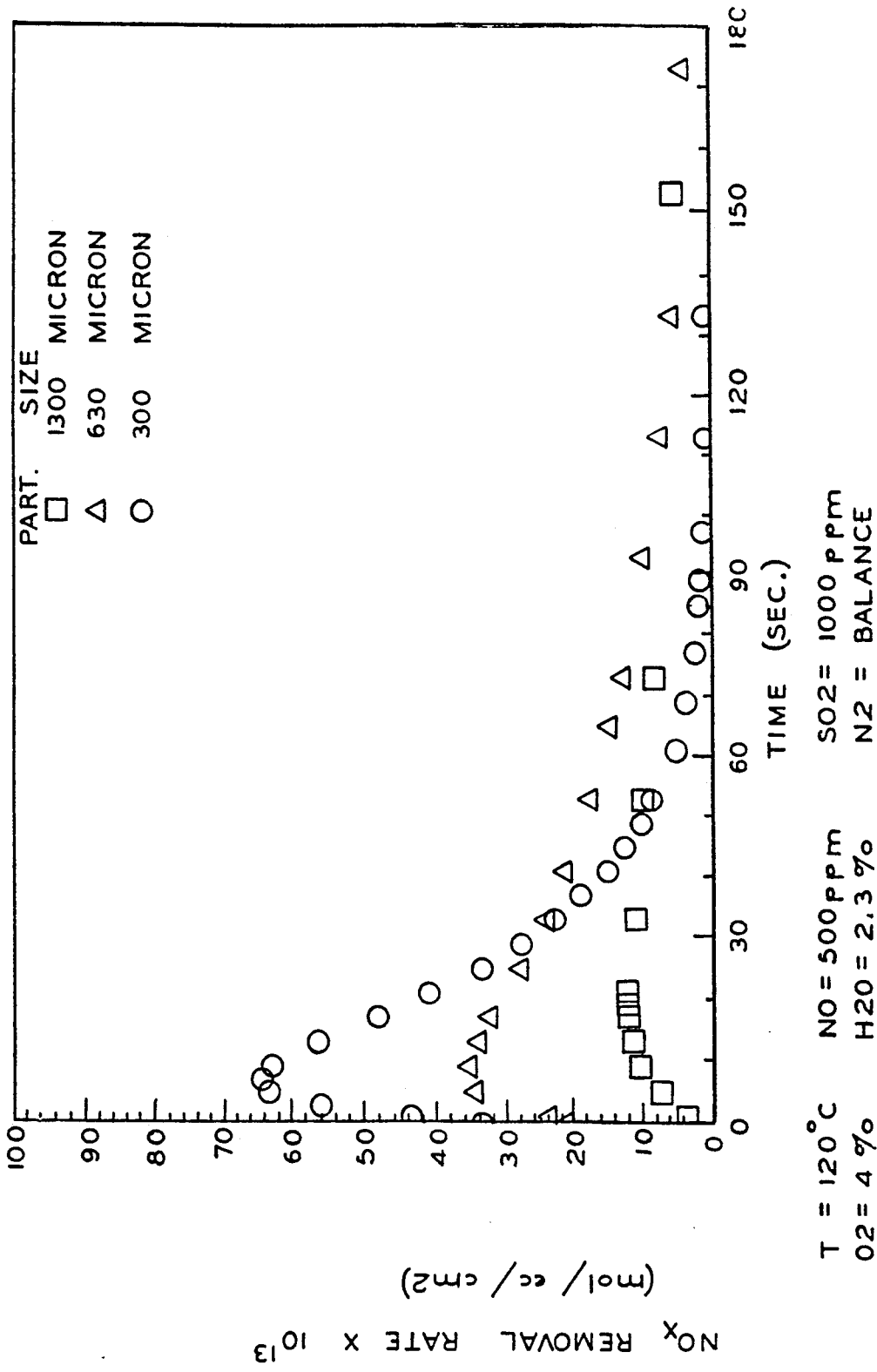
FIG. 2 is a graph showing $NO_x$ removal rate versus sorbent particle size.
Figure 3:
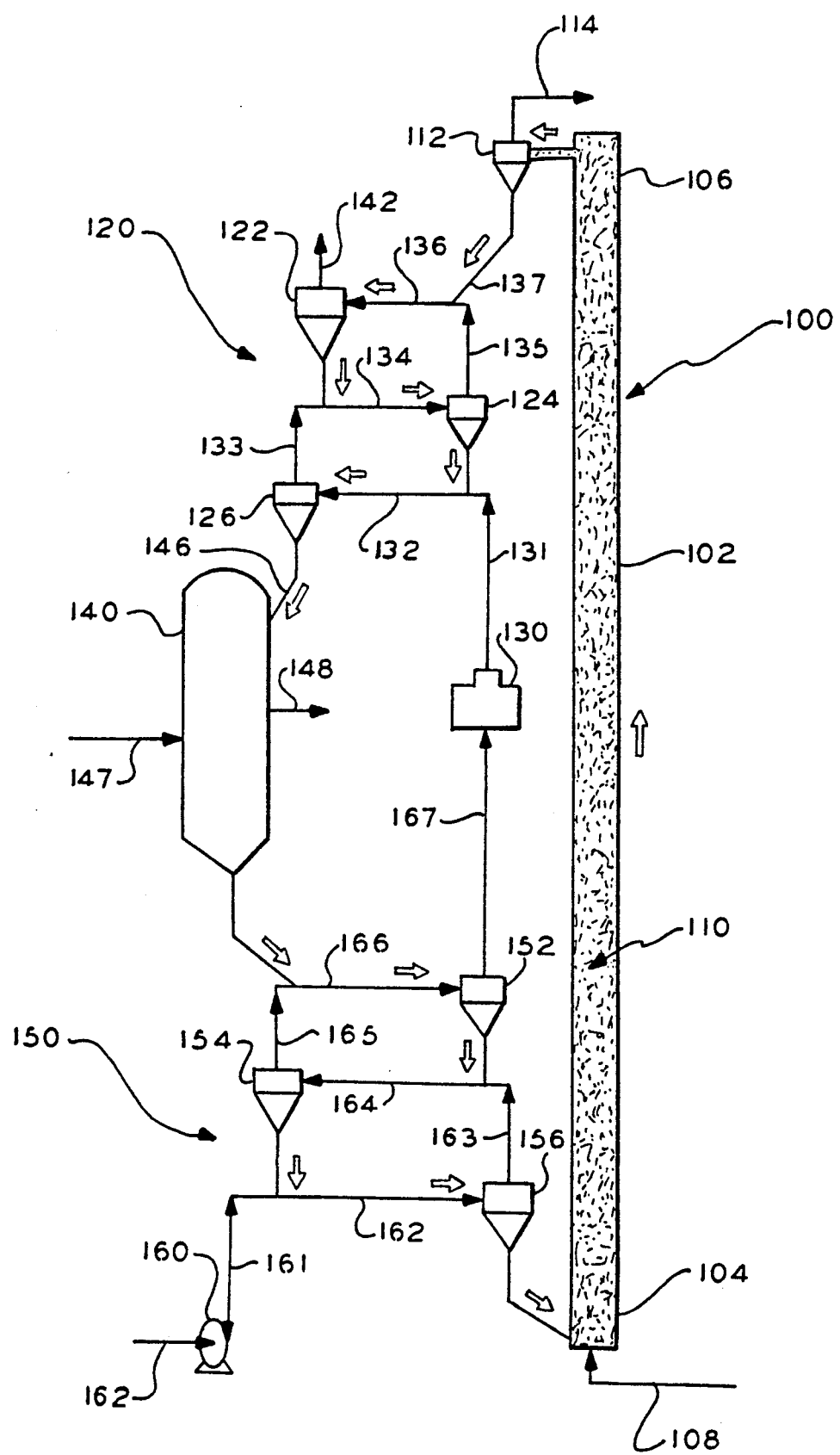
FIG. 3 is a diagrammatical illustration of an embodiment of the improved apparatus and process of the present invention for removing $NO_x$ and $SO_x$ from flue gas and which embodiment uses a transport line adsorber and pluralities of interconnected cyclones.

Referring now to FIG. 3, apparatus embodying the present invention is illustrated diagrammatically and indicated by general numerical designation 100; apparatus 100 is particularly useful for practicing the process of the present invention. Apparatus 100 includes a hollow, generally cylindrical and generally vertically oriented transport line adsorber 102 having a bottom portion 104 and a top portion 106. Suitable sorbent particles for adsorbing nitrogen oxides and sulfur oxides from flue gas containing such oxides are utilized and indicated by general numerical designation 110. Sorbent particles 110 will have a size in the range of about 70 mesh to about 140 mesh and may be, for example, sorbent particles of the general type disclosed in the above-identified patents incorporated herein by reference. Pressurized flue gas indicated by arrow 108 may be, for example, from a coal-fired or an oil-fired power plant (not shown), or from any other source emitting an effluent gas containing nitrogen oxides and sulfur oxides.

It will be generally understood that the sorbent particles 110 are transported upwardly through the transport line adsorber 102 in a fluidized state by the pressurized flue gas 108 to cause the sorbent particles 110 to adsorb the nitrogen oxides and the sulfur oxides contained in the flue gas 108 while the sorbent particles 110 are being transported upwardly through the transport line adsorber 102 in a fluidized state by the pressurized flue gas 108.

The height or length of the transport line 102 is chosen to provide the sorbent particles 110 with sufficient residence or dwell time in the transport line adsorber 102 to permit the sorbent particles 110 to substantially remove substantially all, approximately 90%, nitrogen oxides and sulfur oxides from the flue gas while the flue gas is transporting the sorbent particles 110 upwardly through the transport line adsorber 102 in a fluidized state. It has been determined that for sorbent particles having a size of about 70 mesh, the length of the transport line adsorber will be about 280–285 feet and, it has been determined, for sorbent particles having a size of about 140 mesh, the length of the transport line 102 will be about 35 feet.

The diameter of the transport line adsorber 102 will be chosen to provide the pressurized flue gas 108 with a velocity through the transport line adsorber greater than the terminal velocity of the sorbent particles 110 in the fluidized state, to facilitate the sorbent particles remaining in the fluidized state while being transported upwardly through the transport line adsorber by the pressurized flue gas. In the event the pressure of the flue gas 108 is insufficient to transport the sorbent particles 110 upwardly through the transport line adsorber 102 in a fluidized state, and insufficient to provide the flue gas with a velocity through the transport line adsorber greater than the terminal velocity of the fluidized sorbent particles 110 for a given transport line adsorber diameter, a suitable booster fan may be interposed between the exit of the pressurized flue gas from the power plant (not shown) to boost or increase the pressure of the flue gas sufficiently to place the fluidized sorbent particles in a fluidized state, transport the fluidized sorbent particles in the fluidized state upwardly through the transport line adsorber and to provide the pressurized flue gas with a velocity through the transport line adsorber greater than the terminal velocity of the fluidized sorbent particles.

Upon the sorbent particles 110 adsorbing the nitrogen oxides and sulfur oxides from the pressurized flue gas 108 as described above, the sorbent particles 110 become saturated sorbent particles.

A suitable gas-solid separator 112 is connected to the top portion 106 of the transport line adsorber 102 for receiving and separating the saturated sorbent particles and the pressurized flue gas 108 and for producing a stream of flue gas indicated by arrow 114 with the nitrogen oxides and sulfur oxides substantially removed therefrom. The gas-solid separator 112 may be a suitable cyclone of the type known to the art and generally referred to as a conical dry-air classifier utilizing rotating air for separating finely divided particles from a fluid stream in which the particles are entrained. Accordingly, it will be understood that the cyclone 112 is generally conical in configuration and imparts rotation to the pressurized flue gas 108 and saturated sorbent particles 110 to separate the saturated sorbent particles and pressurized flue gas to produce a nitrogen oxide and sulfur oxide free stream of flue gas indicated by arrow 114. Alternatively, instead of the gas-solid separator 112, a suitable bag house may be connected to the top portion 106 of the transport line adsorber 102 for receiving and separating the saturated sorbent particles and the pressurized gas 108 and for producing the oxide free stream of flue gas indicated by arrow 114.

A first plurality of interconnected cyclones is provided and indicated by general numerical designation 120. Plurality of cyclones 120 includes a top cyclone 122, a middle cyclone 124 and a bottom cyclone 126. Such cyclones may each be of the same type as cyclone 112. It will be noted from FIG. 3 that the plurality of cyclones 120 is disposed in a staggered vertically downward sequence with the middle cyclone 124 being displaced downwardly and laterally rightwardly with respect to top cyclone 122 and that bottom cyclone 126 is displaced downwardly and laterally leftwardly with respect to the middle cyclone 124. A suitable air heater 130 is provided for heating air to approximately 650° C. and for providing heated air to the plurality of cyclones 120, the specific temperature of the heated air will depend upon the specific regenerant gas used. The interconnections between the plurality of cyclones 120 and the interconnection between the air heater 130 and the plurality of cyclones 120 are indicated by the solid arrows 131–136. More particularly, it will be noted that the connection of the output of the air heater 130 to the bottom portion of the middle cyclone 124 is indicated by arrow 131, that the connection between the bottom portion of the middle cyclone 124 and the top portion of the bottom cyclone 126 is indicated by arrow 132, that the interconnection between the top portion of the bottom cyclone 126 and the bottom portion of the top cyclone 122 and the top portion of the middle cyclone 124 is indicated by arrows 133 and 134, and that the connection between the top portion of the middle cyclone 124 to the top portion of the top cyclone 122 is indicated by arrows 135 and 136; it will be further noted that the interconnection between the bottom portion of the gas-solid separator 112 and the interconnection between the top of the middle cyclone 124 and the top of the top cyclone 122 is indicated by line 137. It will be also understood that the directions of the arrows 131–136 also indicate the direction of the flow of the heated air from the air heater 130 through the plurality of cyclones 120.

The outline arrows shown at the top portion of FIG. 3 indicate the flow of the saturated sorbent particles from the bottom portion of the gas-solid separator 112 and through the plurality of cyclones 120 and to a suitable regenerator 140. It will be understood that the saturated sorbent particles are passed or circulated through the plurality of interconnected cyclones 120 by a combination of flow of the heated air through the cyclones 120 and gravity. Generally, as the saturated sorbent particles and heated air enter each cyclone of the plurality 120, rotary motion is imparted to the sorbent particles and heated air to contact the saturated sorbent particles with the heated air to heat the saturated sorbent particles sufficiently to desorb or remove the nitrogen oxides therefrom and to separate the removed nitrogen oxides and the sorbent particles; ultimately, an off gas stream of heated air indicated by arrow 142 at the top portion of the top cyclone 122 carries away the nitrogen oxides removed from the sorbent particles. Heated gas stream 142 and the removed nitrogen oxides entrained therein or carried thereby may be introduced into the combustion gas stream of the power plant (not shown) producing the pressurized flue gas 108. More particularly, it will be understood that the saturated sorbent particles from the bottom of the gas solid separator 112 are transported by the heated air indicated by arrow 136 to the top portion of the top cyclone 122 where rotary motion is imparted to the saturated sorbent particles and heated air to contact the saturated sorbent particles with the heated air to heat the sorbent particles and remove the nitrogen oxides from the sorbent particles and at least partially separate the saturated sorbent particles from the heated air, thereafter the saturated sorbent particles separated by the top cyclone 122 is transported from the bottom portion of the top cyclone 122 to the top portion of the middle cyclone 124 by a combination of gravity and the flow of heated air indicated by the arrow 134 whereupon rotary motion is imparted to the sorbent particles and heated gas by the middle cyclone 122 to further contact the saturated sorbent particles with heated air to heat the sorbent particles sufficiently to remove nitrogen oxides therefrom and to at least further partially separate the heated air and saturated sorbent particles, thereafter the sorbent particles separated by the middle cyclone 124 from the heated gas are transported from the bottom portion of the middle cyclone 124 to the top portion of the bottom cyclone 126 by a combination of gravity and the flow of the heated air indicated by the arrow 132 whereupon rotary motion is imparted to the sorbent particles and heated gas by the bottom cyclone 126 to further contact the sorbent particles with the heated air to heat the sorbent particles sufficiently to further remove nitrogen oxide from the sorbent particles and separate the sorbent particles from the removed nitrogen oxides and heated gas. It will be understood that although three cyclones have been indicated as comprising the plurality of cyclones 120 that such plurality of three cyclones is merely illustrative of the present invention and that the plurality of interconnected cyclones 120 will comprise a sufficient number of interconnected cyclones to assure that substantially all of the nitrogen oxides are removed from the saturated sorbent particles upon the sorbent particles being transported or passed through the plurality of cyclones and contacted with the heated air.

Referring again to the plurality of cyclones 120, it will be noted that the plurality of cyclones 120 are interconnected in such a manner to cause the flow of saturated sorbent particles therethrough indicated by the outline arrows to be generally or substantially counter to the flow of the heated air therethrough indicated by the solid arrows 132-136. Such counter flow enhances the contacting of the heated air with the saturated sorbent particles to facilitate removal of substantially all of the nitrogen oxides from the sorbent particles.

Heated sorbent particles with the nitrogen oxides removed therefrom, but still having the sulfur oxides adsorbed thereto, are transported over the line 146, such as by gravity flow, to the regenerator 140 which may be, for example, the moving bed regenerator 32 shown in FIG. 3 of the patents identified above and incorporated herein by reference. Such sorbent particles will be contacted in the regenerator 140 by a suitable regenerant gas of the type disclosed in the above-identified patents incorporated herein by reference. As taught in the incorporated patents, the regenerant gas upon contacting the heated sorbent particles having the sulfur oxides adsorbed thereto will remove the sulfur oxides and produce heated sorbent particles having the sulfur oxides removed therefrom and an off gas stream of regenerant gas carrying the removed sulfur oxides away, for example to a suitable Claus plant of the type known to the art. The regenerant gas is indicated by arrow 147 in FIG. 3 and the off gas stream of regenerant gas carrying the sulfur oxides away is indicated by the arrow 148.

A second plurality of interconnected cyclones is provided and indicated by general numerical designation 150. Plurality of cyclones 150 includes a top cyclone 152, a middle cyclone 154 and a bottom cyclone 156. Such cyclones may be of the same type as the cyclone comprising the gas-solid separator 112 as described above. It will be noted from FIG. 3 that the plurality of cyclones 150 is disposed in a staggered vertically downward sequence with the middle cyclone 154 being displaced downwardly and laterally leftwardly with respect to the top cyclone 152 and that the bottom cyclone 156 is displaced downwardly and laterally rightwardly with respect to the middle cyclone 154. A suitable fan 160 is provided for providing cooling air to the plurality of cyclones 150; for example the input to the fan 160 may be ambient air indicated by arrow 162. The interconnections between the plurality of cyclones 150 and the interconnection between the fan 160 and the plurality of cyclones 150 are indicated by the solid arrows 161-166. More particularly, it will be noted that the connection of the output of the fan 160 to the bottom portion of the middle cyclone 154 is indicated by arrow 161, that the connection between the bottom portion of the middle cyclone 154 and the top portion of the bottom cyclone 156 is indicated by arrow 162, that the interconnection between the top portion of the bottom cyclone 156 and the bottom portion of the top cyclone 152 and the top portion of middle cyclone 154 is indicated by arrows 163 and 164, and that the connection between the top portion of the middle cyclone 154 to the top portion of the top cyclone 152 is indicated by arrows 165 and 166; it will be further noted that the interconnection between the top portion of the top cyclone 152 and the air heater 130 is indicated by arrow 167. It will be also understood that the directions of the arrows 161-167 also indicate the direction of the flow of the cooled air from the fan 160 through the plurality of cyclones 150 and to the air heater 130.

The outline arrows shown at the bottom portion of FIG. 3 indicate the flow of the heated regenerated sorbent particles from the bottom of the regenerator 140 and through the plurality of cyclones 150 to the bottom portion 104 of the transport line adsorber 102. It will be understood that the heated regenerated sorbent particles from the regenerator 140 are passed or circulated through the plurality of interconnected cyclones 150 by a combination of flow of the cooling air indicated by the solid arrows 161-166 through the cyclones 150 and gravity. Generally, as the heated regenerated sorbent particles from the regenerator 140 and the cooling air enter each cyclone of the plurality 150, rotary motion is imparted to the heated regenerated sorbent particles and cooling air to contact the heated regenerated sorbent particles with the cooling air to cool the sorbent particles sufficiently to place them in a suitable condition for readmittance or reentry into the bottom portion 104 of the transport line adsorber 102 and to separate the heated regenerated sorbent particles and the cooling air from the fan 160; ultimately, an off gas stream of cooling air indicated by arrow 167 at the top portion of the top cyclone 152 enters the air heater 130 for heating to supply the heated air provided by the air heater 130. More particularly, it will be understood that the heated regenerated particles from the bottom of the regenerator 140 are transported by gravity to the interconnections between the top portion of the middle cyclone 154 and the top portion of the top cyclone 152 indicated by the arrows 165 and 166 and that such heated regenerated sorbent particles are transported from the bottom of the regenerator 140 to the top portion of the top cyclone 152 by the combination of gravity and the flow of cooling air indicated by the arrow 166. Upon entering the top cyclone 152, rotary motion is imparted to the heated regenerated sorbent particles and the cooling air to contact the heated regenerated sorbent particles with the cooling air to at least partially cool the heated regenerated sorbent particles and to separate such particles from the cooling air; thereafter, the partially cooled regenerated sorbent particles separated by the top cyclone 152 are transported from the bottom portion of the top cyclone 152 to the top portion of the middle cyclone 154 by a combination of gravity and the flow of cooling air indicated by the arrow 164 whereupon rotary motion is imparted to the sorbent and cooling air to further at least partially cool the heated regenerated sorbent particles and to further separate the cooling air and the regenerated sorbent particles, thereafter, the regenerated sorbent particles separated by the middle cyclone 154 is transported from the bottom portion of the middle cyclone 154 to the top portion of the bottom cyclone 156 by a combination of gravity and the flow of cooling air indicated by the arrow 162 whereupon rotary motion is imparted to the cooling air and partially cooled regenerated sorbent particles to further at least partially cool the regenerated sorbent particles and further separate such particles from the cooling air; the now cooled regenerated sorbent particles separated by the bottom cyclone 156 are then transported by gravity to the bottom portion 104 of the transport line adsorber 102 as noted above for recycling. It will be understood that although three cyclones have been indicated as comprising the plurality of cyclones 150 that such plurality of three cyclones is merely illustrative of the present invention and that the plurality of interconnected cyclones 150 will comprise a sufficient number of interconnected cyclones to assure that the heated regenerated sorbent from the regenerator 140 is cooled sufficiently to place the regenerated sorbent in a thermal condition suitable for readmittance or reentry into the bottom portion 104 of the transport line adsorber 102 for recycling and readsorption of the nitrogen oxides and sulfur oxides 108. The plurality of cyclones 150 will also be of sufficient number to assure substantially total separation of the regenerated sorbent particles and cooling air from the fan 160.

Referring again to the plurality of cyclones 150, it will be noted that the plurality of cyclones 150 are interconnected in such a manner to cause the flow of heated regenerated sorbent particles from the regenerator 140 through the cyclones indicated by the outline arrows to be generally or substantially counter to the flow of the cooling air through the plurality of cyclones 150 indicated by the solid arrows 162-166. Such counter flow enhances the contacting of the cooling air with the heated regenerated sorbent particles to facilitate substantial cooling of the regenerated sorbent particles and substantial separation of the cooled regenerated sorbent particles from the cooling air from the fan 160.

Referring again to the plurality of cyclones 120, it will be understood that a cone of saturated sorbent will be present at the bottom portion of the cyclones 122, 124 and 126 and that such cone of sorbent particles prevents the entry of the heated air from the air heater 130 into the bottom portions of the middle cyclone 124 and the top cyclone 122. Similarly, it will be understood, that a cone of heated regenerated sorbent particles will be present at the bottom portions of the top cyclone 152 and the middle cyclone 154 of the plurality of cyclones 150 and that such cone of heated regenerated sorbent particles prevents the entry of the cooling air into the bottom portions of the middle cyclone 154 and the top cyclone 152.

Lastly, it will be understood that the apparatus and process of the present invention described above and illustrated diagrammatically in FIG. 3, due to the comparative or relatively small size of the sorbent particles 110 (about 70 mesh to about 140 mesh as noted above) is particularly useful in adsorbing or removing nitrogen oxides and sulfur oxides from flue gas that is relatively free from fly ash. However, in the event that the flue gas, such as flue gas 108, has a relatively high content of fly ash, the apparatus and process of the present invention using such relatively small sized sorbent particles can still be utilized but such may require the interposition of a bag house or fly ash control apparatus between the source of the flue gas 108 and the lower portion 104 of the transport line adsorber 102.

It will be understood by those skilled in the art that many variations and modifications may be made in the present invention without departing from the spirit and the scope thereof.

What is claimed is:

1. Process for utilizing cooled regenerated sorbent particles to substantially remove nitrogen oxides and sulfur oxides from pressurized flue gas, comprising the steps of:

providing sorbent particles suitable for adsorbing nitrogen oxides and sulfur oxides from said flue gas and providing said sorbent particles of a size in the range of about 70 to about 140 mesh;

transporting said sorbent particles in a fluidized state through a transport line adsorber utilizing said pressurized flue gas to cause said sorbent particles to substantially adsorb said nitrogen oxides and said sulfur oxides from said flue gas while said sorbent particles are being transported through said transport line adsorber by said pressurized flue gas, upon said sorbent particles adsorbing said nitrogen oxides and said sulfur oxides said sorbent particles becoming saturated sorbent particles;

separating said saturated sorbent particles from said flue gas to provide a stream of substantially nitrogen oxide and sulfur oxide free flue gas;

providing a source of heated gas;

passing said saturated sorbent particles through a plurality of interconnected cyclones utilizing said heated gas and gravity to heat said sorbent particles to remove therefrom said nitrogen oxides and to separate said sorbent and remove nitrogen oxides and to produce an off gas stream of heated gas carrying away said nitrogen oxides;

contacting said heated sorbent with a regenerant gas to substantially remove said sulfur oxides from said sorbent particles and to produce heated regenerated sorbent and an off gas stream of regenerant gas carrying away said sulfur oxides removed from said heated regenerated sorbent;

providing a cooling gas;

passing said heated regenerated sorbent through a second plurality of interconnected cyclones utilizing said cooling gas and gravity to cool said sorbent particles and to separate said sorbent particles from said cooling gas to produce cooled regenerated sorbent; and returning said cooled regenerated sorbent to said transport line adsorber to repeat said steps for removing said nitrogen oxides and said sulfur oxides from said pressurized flue gas.

* * * * *